US012614763B2

(12) United States Patent
Yan et al.

(10) Patent No.: US 12,614,763 B2
(45) Date of Patent: Apr. 28, 2026

(54) POSITIVE ELECTRODE MATERIAL AND PREPARATION METHOD THEREFOR, ALKALINE SECONDARY BATTERY

(71) Applicant: GP Technology & Innovation Limited, Hong Kong (HK)

(72) Inventors: Shuli Yan, Hong Kong (HK); Jean Nei, Hong Kong (HK); Mingde Wang, Hong Kong (HK); Yafei Yang, Hong Kong (HK); Ling Guan, Hong Kong (HK); Shuang Zhang, Hong Kong (HK)

(73) Assignee: GP TECHNOLOGY & INNOVATION LIMITED, Hong Kong (HK)

( * ) Notice: Subject to any disclaimer, the term of this patent is extended or adjusted under 35 U.S.C. 154(b) by 742 days.

(21) Appl. No.: 17/963,711

(22) Filed: Oct. 11, 2022

(65) Prior Publication Data

US 2024/0092657 A1      Mar. 21, 2024

(30) Foreign Application Priority Data

Sep. 16, 2022    (CN) .......................... 202211130721.5

(51) Int. Cl.
*H01M 10/24*        (2006.01)

(52) U.S. Cl.
CPC ......... *H01M 10/24* (2013.01); *C01P 2006/40* (2013.01)

(58) Field of Classification Search
CPC .............................. H01M 10/24; H01M 10/30
See application file for complete search history.

(56) References Cited

U.S. PATENT DOCUMENTS

2012/0276453 A1* 11/2012 Kuzuo .................. H01M 4/366
429/223

FOREIGN PATENT DOCUMENTS

CN            103204555 A  *  7/2013

* cited by examiner

*Primary Examiner* — Niki Bakhtiari
*Assistant Examiner* — James A Corno
(74) *Attorney, Agent, or Firm* — MUNCY, GEISSLER, OLDS & LOWE, P.C.

(57) ABSTRACT

The present invention relates to a positive electrode material comprising a core material and a coating layer coated on the surface of the core material, the core material comprises nickel hydroxide, and the coating layer comprises a tetravalent cobalt compound; and based on the weight of the coating layer, the content of the tetravalent cobalt compound is no less than 45 wt %. The present invention also relates to a preparation method for the positive electrode material. The present invention further relates to an alkaline secondary battery containing the positive electrode material.

8 Claims, 6 Drawing Sheets

FTC4     B04-40-A-B     B05-250-A

FTC4     B04-40-A-B     B05-250-A

POSITIVE ELECTRODE MATERIAL AND PREPARATION METHOD THEREFOR, ALKALINE SECONDARY BATTERY

TECHNICAL FIELD

The present invention relates to a field of an electrochemical cell material, particularly relates to a positive electrode material, a preparation method therefor, as well as an alkaline secondary battery comprising the positive electrode material.

BACKGROUND

Alkaline secondary batteries include nickel-cadmium secondary battery, nickel-zinc secondary battery, nickel-hydrogen secondary battery, etc., and their positive electrode active substance is spherical nickel hydroxide particles. The performance of the alkaline secondary battery is affected by the positive electrode active substance to a great degree. However, nickel hydroxide powder is an electrical insulator (also known as P-type semiconductor with a low electrical conductivity), therefore it lacks electrical conductivity and causes a large contact resistance among nickel hydroxide particles as well as between nickel hydroxide and the current collector, which results in nickel hydroxide not able to fully react during charge and discharge and affects the utilization of the positive electrode active substance and the discharge capacity of the battery.

Aiming at the above-described technical problems, an existing technical solution is adding an appropriate amount of additive into nickel hydroxide to enhance the performance of the positive electrode. For example, cobalt is coprecipitated into nickel hydroxide to improve the utilization at high temperature; alternatively, zinc or magnesium is coprecipitated into nickel hydroxide to improve the lifetime characteristic. From the viewpoint of improving the utilization at high temperature, lifetime characteristic, and rate capability, using cobalt or cobalt compound (for example, CoO, $Co_2O_3$, $Co_3O_4$, $Co(OH)_2$, etc.) as an additive is effective. The added cobalt or cobalt compound is dissolved in a solution of alkali metal hydroxide at high concentration as the electrolyte of the alkaline secondary battery, and it is oxidized to form cobalt oxyhydroxide coated on the surface of the nickel hydroxide particles while charging to improve the electrical conductivity and form a conductive network among nickel hydroxide particles.

Cobalt-type additives can be added into the positive electrode of the alkaline secondary battery in two main ways, physical doping or surface modification.

Wherein, the method of physical doping directly mixes cobalt or cobalt compound with nickel hydroxide to prepare the positive electrode material. Since both nickel hydroxide and cobalt or cobalt compound are in particle format and have different particle sizes, it is difficult to uniformly mix of the two, resulting in uneven distribution of cobalt or cobalt compound. Consequently, uniform conductive network cannot be formed on the surface of the nickel hydroxide particles to effectively reduce the contact resistance among nickel hydroxide particles as well as between nickel hydroxide and the current collector, leading to lower utilization of the active material and limited electrode performance improvement.

Wherein, the method of surface modification uniformly coats a layer of metal cobalt or cobalt compound on the surface of spherical nickel hydroxide particles. There are two main coating methods: 1. coating a cobalt film on the surface of spherical nickel hydroxide particles by electroless plating; and 2. coating $Co(OH)_2$ on the surface of spherical nickel hydroxide particles by coprecipitation. The coprecipitating method includes first formulating an aqueous solution containing cobalt ions and a caustic aqueous alkaline solution, next placing nickel hydroxide particles in the aqueous solution containing cobalt ions, and slowly adding the caustic aqueous alkaline solution while maintaining a constant pH value and stirring. It results in $Co(OH)_2$ precipitated on the surface of the nickel hydroxide particles. After washing and drying in vacuum, $Co(OH)_2$-coated nickel hydroxide particles are then obtained.

However, the existing surface modification methods have the following technical problems:

1. Electroless plating method has very rigorous operating conditions and requires the use of a noble metal as a catalyst.

2. The reaction conditions for the coprecipitation method are rigorous. For example, pH value and the like all require to be strictly controlled. Moreover, the bivalent cobalt compound coated on the surface of spherical nickel hydroxide particles is not conductive and can be easily dissolved without further treatment, so it needs to be electrochemically oxidized into a trivalent state (i.e. β-CoOOH) in order to obtain conductivity and provide an effective conductive network by initial charging of the battery. However, since the electrochemical oxidation reaction within the battery cannot completely transform the bivalent cobalt compound to trivalent cobalt compound, the electrically conductive performance of this type of conductive network is insufficient, resulting in lower utilization of nickel hydroxide.

3. Cobalt hydroxide is coated on the surface of spherical nickel hydroxide particles by coprecipitation method and oxidized to cobalt oxyhydroxide (β-CoOOH and/or γ-CoOOH) through a solid-gas oxidation reaction in an alkaline solution of high concentration under oxygen. After forming cobalt oxyhydroxide on the surface of spherical nickel hydroxide particles, the internal resistance of the nickel hydroxide electrode decreases, and the polarization of the positive electrode decreases. Thereby, the charging efficiency, depth of discharge, as well as utilization of the active substance of the positive electrode are enhanced. However, this method has the following technical problems: (1) spherical nickel hydroxide particles coated with cobalt hydroxide require to be physically mixed with an alkaline solution to form a slurry to be subsequently oxidized in an oxygen atmosphere, therefore issues such as uneven oxidation as well as difficult control of precise oxidation degree with oxygen gas as an oxidant may arise; and (2) fine nickel hydroxide particles may agglomerate together by the dissolution of $Co(OH)_2$ on their surface and redeposition of cobalt oxyhydroxide to form larger aggregates of spherical nickel hydroxide particles. Moreover, the alkaline solution can also react with carbon dioxide in air to generate carbonate, which plays the role of adhesive among some fine spherical cobalt oxyhydroxide-coated nickel hydroxide particles during drying. The resulted agglomeration in nickel hydroxide material can reduce the fluidity of positive electrode paste or slurry made of such material, making filling the paste or slurry into pores of nickel foam substrate not as effective. The prepared battery electrode sheet is thicker, brittle, and easily broken when winding the electrode assembly, causing short-circuit of the battery. Such electrode cannot be used for high-capacity battery.

4. After cobalt hydroxide is coated on the surface of spherical nickel hydroxide particles through the coprecipitation method, cobalt oxyhydroxide is formed on the surface of spherical nickel hydroxide by mixing and reacting with the alkaline solution as well as a solution containing an oxidant. However, this method has the following technical problems: (1) the obtained spherical nickel hydroxide particles coated with cobalt oxyhydroxide is unstable at high temperature as a positive electrode for the battery, wherein the coating layer of the particles is easily reduced to soluble $Co(OH)_2$ during charge/discharge at high temperature to expose $\beta$-$Ni(OH)_2$. Overcharge of $\beta$-$Ni(OH)_2$ is easier at high temperature and can lead to the formation of irreversible $\gamma$-NiOOH phase; (2) this method often results in an uneven coating layer on nickel hydroxide particles; and (3) when nickel hydroxide coated with cobalt hydroxide is oxidized by a solution containing an oxidant, a portion of nickel hydroxide as the core material is easily oxidized to generate relatively unstable nickel oxyhydroxide. Therefore, adhesiveness of the cobalt coating can become unstable.

SUMMARY

Aiming at technical problems present in the prior art, purposes of the present invention are to provide a positive electrode material that has a coating layer with excellent uniformity, electrical conductivity, and stability and is suitable as the positive electrode active substance of an alkaline secondary battery.

On the first aspect, the present invention provides a positive electrode material comprising a core material and a coating layer on the surface of the core material. The core material comprises nickel hydroxide. The coating layer comprises a tetravalent cobalt compound, and based on the weight of the coating layer, the content of the tetravalent cobalt compound is no less than 45 wt %. The tetravalent cobalt compound in the coating layer has a higher electrical conductivity and is relatively not easy to be reduced to a bivalent cobalt compound. Since the bivalent cobalt compound is very easily dissolved in an alkaline solution, thereby resulting in electrically conductive network being destroyed. Therefore, the alkaline secondary battery prepared by using the positive electrode material provided by the present invention as the positive electrode active material has a higher capacity and smaller internal pressure, and the alkaline secondary battery can also recover its capacity effectively after long-term overdischarge or stored in a short-circuit state.

Furthermore, based on the weight of the positive electrode material, the content of cobalt coating in the positive electrode material preferably is within the range of 2 wt %-10 wt %. When the content of cobalt coating in the positive electrode material is less than 2 wt %, the coating layer is coated insufficiently, resulting in a lack of coating effectiveness; and when the content of cobalt coating in the positive electrode material exceeds 10 wt %, no further improvement in performance of the positive electrode material is observed.

Furthermore, calcium (Ca), magnesium (Mg), zinc (Zn), etc. may be added as additive/modifier in the coating layer of the positive electrode material used in the battery to improve certain performances. However, when the content of cobalt in the coating layer is less than 90 wt %, the improvement in electrical conductivity brought about by coating cannot be sufficiently obtained.

In one Example, in the coating layer of the positive electrode material provided by the present invention, the valence of cobalt in cobalt compounds other than tetravalent cobalt compounds is 3 or more, and good adhesiveness and electrical conductivity can be obtained.

In one Example, the core material is nickel hydroxide represented by a general formula: $Ni_{1-x-y}Co_xN_y(OH)_2$ (wherein, x is 0.005-1, y is 0.005-1, and N is one of Ca, Mg, and Zn). The coating layer of the positive electrode material comprises tetravalent cobalt compound, and based on the weight of the coating layer, the content of the tetravalent cobalt compound is no less than 60 wt %.

Compared with the existing nickel hydroxide coated with $\gamma$-CoOOH and/or $\beta$-CoOOH, the positive electrode material provided by the present invention is more stable and has higher electrical conductivity. It is unexpectedly found by the inventors that, the positive electrode material provided by the present invention as the positive electrode active substance of the alkaline secondary battery may significantly suppress the problem of capacity decay of the alkaline secondary battery at high temperature. Although the specific mechanism is not clear yet, the inventors speculate the reasons being: (1) the coating layer with no less than 45 wt % of tetravalent cobalt compound enlarges the difference ($\Delta E_{OE-O}$) between oxygen evolution potential ($E_{OE}$) and oxidation potential ($E_O$) of the positive electrode material at high temperature; (2) the coating layer with no less than 45 wt % of tetravalent cobalt compound retards the oxygen evolution reaction rate of the positive electrode material at high temperature; (3) the coating layer with no less than 45 wt % of tetravalent cobalt compound reduces the difference ($\Delta E_{O-R}$) between oxidation potential ($E_O$) and reduction potential ($E_R$) of the positive electrode material at high temperature, so reaction reversibility is increased, thereby capacity decay is reduced; and (4) the coating layer with no less than 45 wt % of tetravalent cobalt compound contains more micropores for adsorbing water, thereby reducing the amount of free water.

On the second aspect, the present invention provides a method for preparing the positive electrode material including the following steps:

a step of preparing a precursor through a coprecipitation method, comprising formulating a first solution containing M ions (M is one of Ca, Mg, and Zn), cobalt ions, nickel ions and ammonium ions; formulating a first alkaline solution containing hydroxyl ions; and uniformly mixing the first alkaline solution and the first solution, collecting the resulted precipitate, washing the precipitate, and drying the precipitate at high temperature to obtain the precursor;

a coating step, comprising formulating a second alkaline solution containing ammonium ions, formulating a second solution containing cobalt ions; dispersing the precursor in the second solution to form a first suspension; and adding the second alkaline solution into the first suspension while stirring, collecting the resulted precipitate, washing the precipitate, and drying the precipitate at high temperature to obtain particles having a coating layer comprising $\alpha$-Co $(OH)_2$; and an oxidizing step, formulating a sodium hypochlorite solution; dispersing the particles coated with $\alpha$-$Co(OH)_2$ in water to form a second suspension; and adding the sodium hypochlorite solution into the second suspension while maintaining a constant temperature and stirring, collecting the resulted precipitate, washing the precipitate, and drying the precipitate to obtain the positive electrode material.

In the step of precursor preparation, the first solution and the first alkaline solution are mixed, so that M ions and cobalt ions of low concentration as well as nickel ions of high concentration are transformed into hydroxide under alkaline condition to be enriched, and there is a correlated surface compound generated by a complexing reaction of ammonium ions, water molecules, and surface hydroxyl ions on the surface. Precipitation speeds for M, cobalt, and nickel are similar. Furthermore, the first alkaline solution is a solution formulated by a strong base, for example, one of sodium hydroxide solution and potassium hydroxide solution, and it is used for precipitating the metal ions in the first solution. From the viewpoint of reducing cost, the metal ions in the first solution are preferably derived from sulfates (cobalt ions derived from cobalt sulfate, M ions derived from M sulfates, and nickel ions derived from nickel sulfate), and ammonium ions are preferably derived from ammonium sulfate. If the metal ions in the first solution are derived from chlorides, it could result in a small amount of chlorine ions in the precursor, and the presence of chlorine ions may ultimately be disadvantageous for the electrochemical performance of the positive electrode material. The precipitate collected after mixing the first alkaline solution and the first solution is hydroxide precipitate enriched in M, cobalt, and nickel, whose main component is nickel hydroxide. Nickel hydroxide in the prepared precursor has a high crystallinity, and therefore oxidation of nickel hydroxide by the oxidant can be significantly inhibited in the oxidizing step.

Furthermore, if M ions are Zn ions, during mixing the first solution and the first alkaline solution, the precipitated zinc hydroxide is inhibited from dissolving in the strong alkaline to generate a zincate or reacting with aqueous ammonia to generate zinc-ammonium complex ions by controlling the speed of addition of the first alkaline solution into the first solution as well as pH value of the final mixture.

Moreover, the prepared precursor demonstrates improved solid-phase electrical conductivity, solid-phase structural stability as well as solid-phase proton conductivity by doping. The positive electrode material prepared by the method provided by the present invention enables the completion of charge reaction for the material before the occurrence of the oxygen evolution side reaction due to the significant enhancement in reaction performance for nickel hydroxide in the positive electrode material. Poor results resulting from oxygen evolution reaction, such as reduction in charging coulomb efficiency, increase in internal pressure of the battery, battery overheating and the like, are effectively avoided, so that the battery is safer with higher efficiency.

In the coating step, uniformity and adhesiveness of the coating with $\alpha$-Co(OH)$_2$ as the main component can be stably ensured. During feeding of the second alkaline solution to the first suspension, the second alkaline solution is in a highly dispersed state by mechanical stir, so that the second alkaline solution can rapidly be mixed with the first suspension uniformly, realizing the purpose of uniformly and slowly adjusting the pH value of the mixed solution. Also, the precipitation reaction for cobalt hydroxide can be performed very uniformly on a three-dimensional spatial scale of the solution to form nano cobalt hydroxide, which not only effectively controls the size of cobalt hydroxide particles and the uniformity of cobalt hydroxide coated on the surface of the precursor (nickel hydroxide doped with M and cobalt), but also is beneficial for rapid crystallization of cobalt hydroxide.

It is unexpectedly found that, the controlled microcrystalline morphology of surface $\alpha$-Co(OH)$_2$ coating obtained in the coating step could make controlling the subsequent oxidizing procedure easier, enabling faster and more complete oxidation.

Furthermore, cobalt ions in the second solution are derived from a cobalt salt, and there is no particular limitation for the cobalt salt as long as it is a water-soluble cobalt salt that can form $\alpha$-Co(OH)$_2$ by controlling the pH value.

Specifically, cobalt sulfate and cobalt chloride are preferable, and cobalt sulfate without pollution caused by a halogen is more preferable.

Furthermore, during feeding of the second alkaline solution to the first suspension, firstly-generated nano-scaled cobalt hydroxide particles in the solution phase are the primary particles, and the particles of composite material formed by cobalt hydroxide particles attaching onto the surface of the precursor are the secondary nano particles. By controlling the speed for addition of the second alkaline solution into the first suspension, the purpose of slowly and uniformly adjusting the pH value in the solution is realized, enabling cobalt hydroxide to be uniformly coated on the surface of the precursor and ensuring the generated cobalt hydroxide to mainly comprise $\alpha$-Co(OH)$_2$.

In the oxidizing step, $\alpha$-Co(OH)$_2$ on the surface of the particles is oxidized by using a sodium hypochlorite solution to obtain higher-valence cobalt compounds, which can significantly improve the electrical conductivity of the positive electrode material, and the obtained positive electrode material has a uniform coating with better adhesiveness. By controlling the content of sodium hypochlorite in the sodium hypochlorite solution and the speed for adding the sodium hypochlorite solution into the second suspension, the content of tetravalent cobalt compound in the coating layer of the obtained positive electrode material is indirectly controlled.

Furthermore, the coating layer of the positive electrode material prepared by the method provided by the present invention has a porous structure, so that the positive electrode material has a rapid solid-phase proton conduction during charge/discharge. Moreover, the liquid phase within the pores of the solid porous positive electrode material has a rapid ion conduction, so that the positive electrode material not only has a lower ohmic drop but also a lower reaction impedance during charge/discharge to satisfy the high-rate charge/discharge requirement. In the alkaline secondary battery containing the positive electrode material, the coating layer contains more micropores to adsorb water due to the porous structure of the coating layer of the positive electrode material, thereby reducing the amount of free water in the electrolyte solution of the alkaline secondary battery and effectively inhibiting the capacity decay for the alkaline secondary battery at high temperature.

The inventors find that, in the positive electrode material prepared by using the above-described method, the content of tetravalent cobalt compound in the coating layer is no less than 45 wt %.

The preparation method provided by the present invention may improve its production efficiency by performing in a continuous way. However, in order to realizing a uniform coating on nickel hydroxide, the preparation method is preferably performed in an intermittent way.

On the third aspect, the present invention provides an alkaline secondary battery, a positive electrode active substance of which comprises the positive electrode material. The positive electrode material has a high electrical conductivity and stability, therefore it is suitable to be used as the positive electrode active substance of alkaline secondary batteries as power supplies for electric vehicles or hybrid vehicles requiring high output performance. Also, the positive electrode material enhances its utilization by improving the electrical conductivity, therefore it is very effective as the positive electrode active substance of alkaline secondary batteries as power supplies for portable electronic equipment requiring high capacity.

DESCRIPTION OF DRAWINGS

Appended drawings further describe the present invention; however, Examples in drawings do not constitute any limitation to the present invention.

DETAILED DESCRIPTION OF EMBODIMENTS

Figure 1:
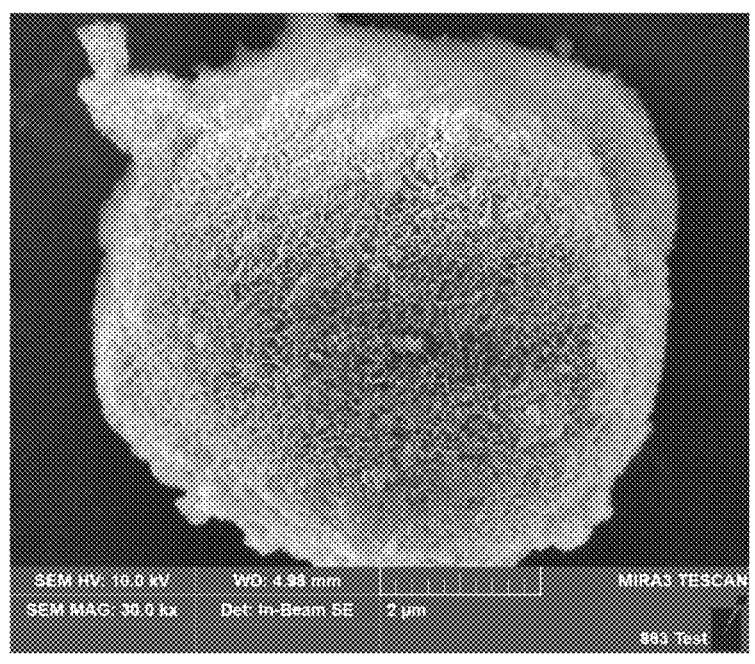
FIG. 1 shows a SEM photograph for FTC4 in Example 1.

It should be understood that, specific Examples described herein are only for explaining the present invention but not for limiting the present invention.

The inventors study the existing technical solution for preparing the nickel hydroxide positive electrode material and obtain the following knowledge:

1. An existing method for preparing nickel hydroxide is mainly precipitation in the liquid phase, wherein nickel hydroxide is precipitated by adding an alkaline solution in a solution containing nickel. If doping is performed, coprecipitation is performed by means of a mixed solution of nickel ions and doping ions. However, drop-by-drop or continuous feeding method used for adding the alkaline solution into the reaction solution during coprecipitation can easily cause the local alkaline concentration to be too high in the solution, resulting in the formation of inhomogeneous agglomerate particles of amorphous phase due to the local precipitation speed being too fast. This kind of agglomerate requires a subsequent aging process at higher temperature and for a longer period to demonstrate the formation of β type of crystal structure. Local overly-high alkaline concentration during the preparation of the doped nickel hydroxide material also easily causes uneven coprecipitation distribution of the doping elements, and thus stable crystal structure, solid-phase electrical conductivity and proton conductivity enhancements usually come with doping are not exhibited. The prepared nickel hydroxide material has problems of larger particles, poorer electrical conductivity, and lower solid-phase proton conductivity, so that the practical utilization of the material is lower, and the high-rate performance is poor, which seriously restricts its application in high-power alkaline secondary batteries.

2. In an existing coprecipitation method, during preparing the cobalt hydroxide coating layer on the surface of nickel hydroxide, when the cobalt ion concentration increases sharply and exceeds the critical supersaturation in the pH region of the suspension in which the cobalt ions exist, cobalt hydroxide is precipitated alone in water even if nickel hydroxide particles do not exist in the vicinity. However, when the pH value of the above-mentioned suspension is low, specifically, when the pH is less than 8, the precipitation rate of cobalt hydroxide becomes slow. Therefore, even if the cobalt ion concentration exceeds the critical supersaturation, cobalt hydroxide may be precipitated alone. On the one hand, when the pH value of the suspension in which the cobalt ions exist is 8 or higher, the critical supersaturation of the cobalt ion concentration decreases. Consequently, if the cobalt ion concentration is increased, it would easily exceed the critical supersaturation. As a result, cobalt hydroxide is precipitated separately without adhering to the surface of the nickel hydroxide particles. The attachment of the separately precipitated cobalt hydroxide to the surface of nickel hydroxide particles may result in poor uniformity.

3. The spherical nickel hydroxide with the surface coated with bivalent cobalt compound (mainly cobalt hydroxide) is subjected to oxidation treatment by using the prior art, so that bivalent cobalt compound of the coating layer is oxidized to form an existing cobalt oxyhydroxide of higher valence. A main component of the obtained coating layer is β-CoOOH (cobalt in β-CoOOH having a valence of +3). The alkaline secondary battery using this kind of positive electrode active substance tends to suffer from a problem of an unrecoverable capacity for the positive electrode after experiencing discharge at a high rate, deep discharge, short circuit or the like. Wherein, the main reason for the unrecoverable capacity is due to the partial reduction of the β-CoOOH conductive network on the nickel hydroxide after deep discharge, which leads to the reduced product of bivalent cobalt easily dissolving and forming complex ions of cobalt in the electrolyte of the battery, thereby causing the incomplete conductive network of β-CoOOH.

4. The spherical nickel hydroxide with the surface coated with bivalent cobalt compound (mainly cobalt hydroxide) is subjected to oxidation treatment by using the prior art. In order to oxidize the bivalent cobalt compound in the coating layer to form γ-CoOOH with a Co valence state higher than +3 (the valences of cobalt in γ-cobalt oxyhydroxide have two alternative valences, valence of +3 and valence of +4, so the average valence may be greater than valence of +3. Its theoretical valence is up to a valence of +3.67), the cobalt hydroxide layer coated on the surface of nickel hydroxide requires to be oxidized by using oxygen gas under an alkaline condition. However, direct oxidation reaction for cobalt hydroxide may vary greatly depending on the concentration of alkaline components present in the surroundings, the minute moisture of the particles as well as the temperature of the particles during treatment, the surrounding humidity, the concentration of oxygen, etc., which could cause complicated reaction trajectory and therefore a portion of cobalt in the coated cobalt layer not fully oxidized. Particularly, water generated in the reaction would cause the cobalt-coated spherical nickel to easily agglomerate in the process of oxidation, and the coated cobalt layer could be damaged due to adhesion in the subsequent washing process.

5. The oxidation reaction of the cobalt hydroxide layer coated on the surface of nickel hydroxide is not only affected by the controlling in the oxidation process, but it also may be affected by the technical controlling when forming the cobalt hydroxide; particularly, it may be closely correlated with the crystalline state (microcrystalline morphology) of the coating layer surface. That is to say, the microcrystalline morphology of cobalt hydroxide has a direct effect on the components of the coating layer ultimately generated by oxidizing, as well as the final coating layer's uniformity, the integrity and the binding compactness with the core material, which in turn affects the discharge performance at high rate, recovery performance after overdischarge, cycling performance and the like of the positive electrode material.

6. In an existing technical solution, during oxidizing the surface-coated cobalt hydroxide layer by using oxygen gas as a oxidant to obtain γ-CoOOH, there is a process of re-dissolving as well as recrystallization and aggregation, specifically including the following reactions:

$$Co(OH)_2 + OH^- \rightarrow HCoO_2^- + H_2O \qquad \text{(dissolution reaction)}$$

$$HCoO_2^- + 1/2H_2O + 1/4O_2 \rightarrow \\ CoOOH + OH^- \qquad \text{(oxidation and precipitation reaction)}$$

If the recrystallized and aggregated γ-CoOOH does not occur on the surface of the nickel hydroxide particles but separately exist, it may directly affect the amount of the cobalt coating on the surface of the nickel hydroxide particles, which in turn affects the uniformity and the integrity of the conductive network as well as the electrical conductivity of the particles.

7. In the existing technical solution, other oxidants such as sodium hypochlorite, persulfate and the like could be used to replace oxygen gas for the oxidation of cobalt hydroxide to cobalt oxyhydroxide. However, it is easier for these oxidants to react with nickel hydroxide compared to oxygen gas and generate relatively unstable oxidation product of nickel hydroxide. Therefore, adhesiveness of the coating can become unstable.

The present invention is now described with specific Examples to demonstrate the improvements of the technical solution provided by the present invention over the above-described knowledge.

Example 1

The present Example provides a positive electrode material comprising a core material and a coating layer coated on the surface of the core material. The core material comprises nickel hydroxide. The coating layer comprises a tetravalent cobalt compound, and based on the weight of the coating layer, the content of the tetravalent cobalt compound is 67 wt %.

A preparation method for the positive electrode material provided by the present Example includes the following steps:

S100: 3.50 g of $ZnSO_4 \cdot 7H_2O$, 43.00 g of $NiSO_4 \cdot 6H_2O$, 0.95 g of $CoSO_4 \cdot 7H_2O$, and 5.00 g of $(NH_4)_2SO_4$ are dissolved in 250 mL of deionized water to obtain the first solution. 1 N NaOH solution is prepared as the first alkaline solution and pumped into the first solution at a speed of 3 mL/min, adjusting the pH value of the mixed solution to 12, which is maintained for 24 h at room temperature (if necessary, adjusting the pH value by means of 10 N NaOH). The resulted precipitate is collected, washed, and dried at 80° C. for 12 h to obtain a precursor, donated as SJ18P;

S200: 10 g of $(NH_4)_2SO_4$ is dissolved in 60 mL of deionized water to obtain solution A. 100 mL of $NH_3 \cdot H_2O$ is fully mixed with 100 mL of deionized water to obtain solution B. Solution A and solution B are mixed to obtain the second alkaline solution. 37.80 g of $CoSO_4 \cdot 7H_2O$ is dissolved in 1000 mL of deionized water to obtain the second solution. 250 g of SJ18P is transferred into the second solution, and the mixture is stirred for 15 min to disperse SJ18P to form the first suspension. While stirring at 460 rpm, the second alkaline solution is pumped into the first suspension at a speed of 1.0 mL/min, the pH value of the mixture is controlled at 8.1±0.1 after the color of the mixture is changed from green to bluish green, and the total amount of the second alkaline solution added is controlled at about 47 mL. Stirring is stopped after aging for 60 min, and the precipitate is collected, washed, and dried at about 55° C. for 12 h to obtain SJ18P particles having α-$Co(OH)_2$ as a coating layer, donated as SJ18NP;

S300: Around 3.50 g of SJ18NP is added into 200 mL of deionized water. The mixture is heated in a water bath (with a temperature for the water bath of about 55° C.) and stirred (with a stirring speed controlled at 250 rpm) to form a second suspension. The second suspension is maintained at a constant-temperature state of about 55° C. After diluting 1.3 mL of NaClO solution (with a NaClO content of 4.5 wt %) with 9 mL of deionized water, it is added drop by drop into the second suspension in about 3 min, and the mixture is stirred at 250 rpm for 1 h. The precipitate is then collected, washed, and dried at about 55° C. for 12 h to obtain a positive electrode material, donated as FTC4, with a yield being about 3.5 g.

Figure 2:
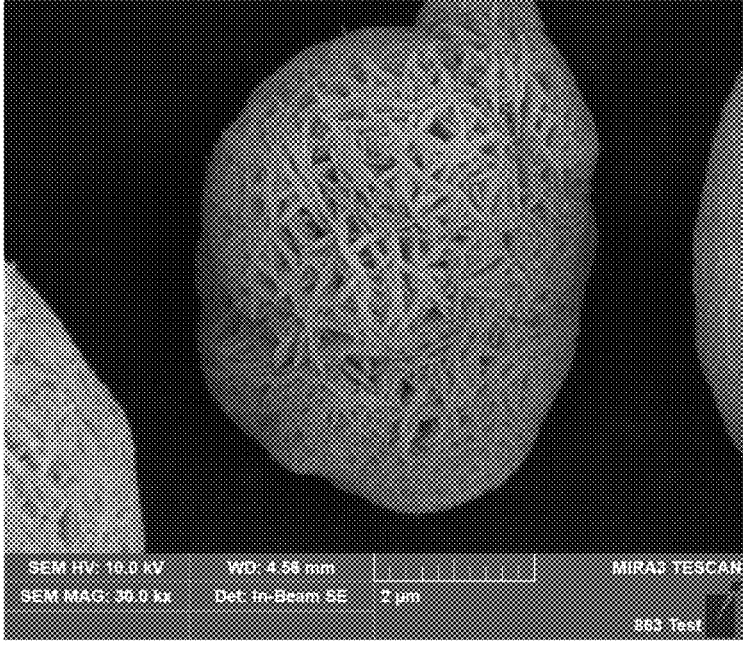
FIG. 2 shows a SEM photograph for SJ18P in Example 1.
Figure 3:
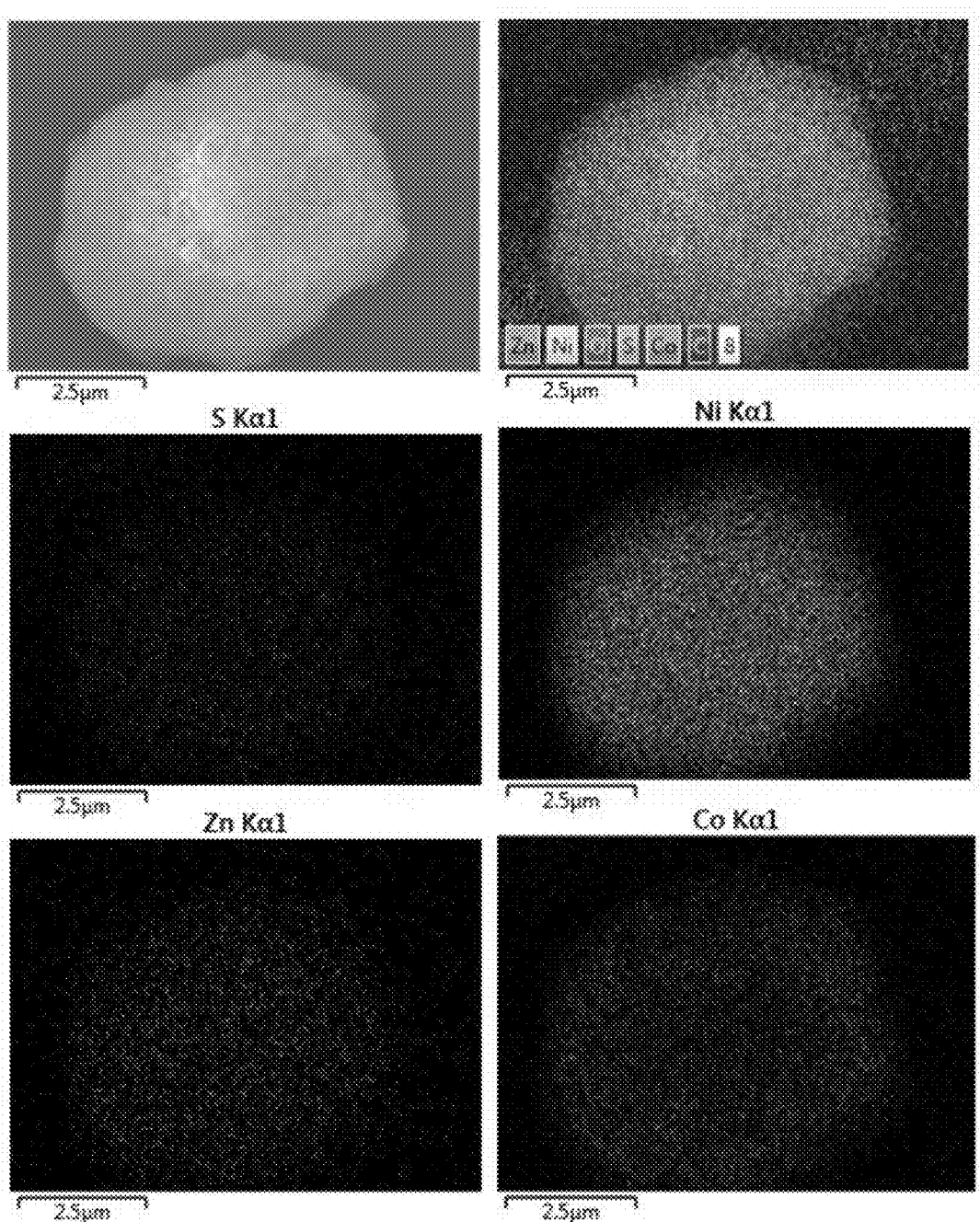
FIG. 3 shows EDS mappings for FTC4 in Example 1.

A SEM photograph for FTC4 is shown in FIG. 1, and a SEM photograph for SJ18P is shown in FIG. 2. According to a comparison of FIG. 1 and FIG. 2, the coating layer completely covers the surface of SJ18P, and none of the original surface structure of SJ18P can be seen on the prepared positive electrode material FTC4. EDS mappings for FTC4 are shown in FIG. 3, and the cobalt element from the coating layer appears to be uniformly distributed. Therefore, when FTC4 is used as the positive electrode active substance of the battery, uniform distribution of electrically conductive cobalt compound forms a conductive network among the particles of the positive electrode material and improve the utilization of the positive electrode.

In the step S100, any locally overly-high alkaline concentration in the mixture is avoided by controlling the addition speed for the first alkaline solution. The precipitation speed is limited to form uniform precursor particles in composition and size by limiting the addition speed for the first alkaline solution. Nickel hydroxide in the obtained precursor has a β type of crystal structure by controlling the composition for the metal ions in the first solution and adjusting and maintaining the pH of the mixture at 12; and the precursor as the core material can be significantly inhibited from being oxidized by sodium hypochlorite in the oxidizing step by doping with zinc and cobalt to obtain a stable crystal structure.

In the step S200, during adding the second alkaline solution to the first suspension, cobalt ions present in the area with a low pH value of the mixture. However, as the pH value of the mixture rises, cobalt hydroxide starts to precipitated gradually. At this time, if there are nickel hydroxide particles nearby, cobalt hydroxide is precipitated on the surface of energetically more stable nickel hydroxide particles. Continuously stirring of the mixture can prevent areas with extremely high cobalt ion concentration in the mixture, and controlling the addition speed and the total amount for the second alkaline solution can inhibit areas with high pH value in the mixture. The precipitation speed for cobalt hydroxide may be adjusted by controlling the pH value of the mixture. It is found that when the pH value of the mixture is within the range of 8.1±0.1, the presence of the precursor particles may inhibit separate precipitation of cobalt hydroxide. Also, α-$Co(OH)_2$ with high adhesiveness may be uniformly precipitated on the surface of the precursor particles. The microcrystalline morphology of the precipitated cobalt hydroxide is affected by a synergistic effect of controlling the pH value range and the precursor particles.

In the step S300, the sodium hypochlorite solution is added while maintaining the second suspension at a constant-temperature state of about 55° C. The reason for this operation is that, when the temperature is less than about 50° C., the speed for oxidation reaction reduces; and when the temperature exceeds 60° C., the speed for oxidation reaction is too fast, causing uneven oxidation for the coating layer $\alpha$-Co(OH)$_2$. In addition, the temperature for the second suspension is preferably maintained constant within the range of 55±1° C. When the temperature change exceeds the above-described range, the content of tetravalent cobalt compound in the coating layer of the formed positive electrode material may be changed. Therefore, the characteristic of a battery using this positive electrode material may not be stable. Sodium hypochlorite as the oxidant oxidizes $\alpha$-Co(OH)$_2$ into a high-valence cobalt compound. Compared with oxygen gas, sodium hypochlorite is a higher-valence oxidant; in combination with the special structure of $\alpha$-Co(OH)$_2$, sodium hypochlorite can oxidize $\alpha$-Co(OH)$_2$ into a coating layer having 67 wt % of tetravalent cobalt compound based on. By controlling the addition speed of the sodium hypochlorite solution, in combination with subsequent stirring, $\alpha$-Co(OH)$_2$ becomes fully oxidized.

Besides a tetravalent cobalt compound, the coating layer of the positive electrode material obtained in the present Example may also contain at least one of $\gamma$-CoOOH (cobalt contained therein is not at a valence of +4) and $\beta$-CoOOH.

Example 2

The present Example provides a positive electrode material comprising a core material and a coating layer coated on the surface of the core material. The core material comprises nickel hydroxide. The coating layer comprises a tetravalent cobalt compound, and based on the weight of the coating layer, the content of the tetravalent cobalt compound is 76 wt %.

A preparation method for the positive electrode material provided by the present Example includes the following steps:

S100: same as that in step S100 of Example 1 to prepare SJ18P;

S200: same as that in step S200 of Example 1 to prepare SJ18NP;

S300: Around 40 g of SJ18NP is added into 1200 mL of deionized water. The mixture is heated in a water bath (with a temperature for the water bath of about 25° C.) and stirred (with a stirring speed controlled at 280 rpm) to form a second suspension. The second suspension is maintained at a constant-temperature state of about 25° C. After diluting 1.8 mL of NaClO solution (with a NaClO content of 18 wt %) with 20 mL of deionized water, it is added drop by drop into the second suspension in about 20 min, and the mixture is stirred at 280 rpm for 1 h. The precipitate is then collected, washed, and dried at about 55° C. for 12 h to obtain a positive electrode material, donated as B04-40-A-B, with a yield being about 40 g.

Example 3

The present Example provides a positive electrode material comprising a core material and a coating layer coated on the surface of the core material. The core material comprises nickel hydroxide. The coating layer comprises a tetravalent cobalt compound, and based on the weight of the coating layer, the content of the tetravalent cobalt compound is 74 wt %.

A preparation method for the positive electrode material provided by the present Example includes the following steps:

S100: same as that in step S100 of Example 1 to prepare SJ18P;

S200: same as that in step S200 of Example 1 to prepare SJ18NP;

S300: Around 250 g of SJ18NP is added into 3000 mL of deionized water. The mixture is heated in a water bath (with a temperature for the water bath of about 25° C.) and stirred (with a stirring speed controlled at 260 rpm) to form a second suspension. The second suspension is maintained at a constant-temperature state of about 25° C. After diluting 10 mL of NaClO solution (with a NaClO content of 18 wt %) with 100 mL of deionized water, it is added drop by drop into the second suspension in about 20 min, and the mixture is stirred at 260 rpm for 1 h. The precipitate is then collected, washed, and dried at about 55° C. for 12 h to obtain a positive electrode material, donated as B05-250-A, with a yield of about 250 g.

Figure 4:
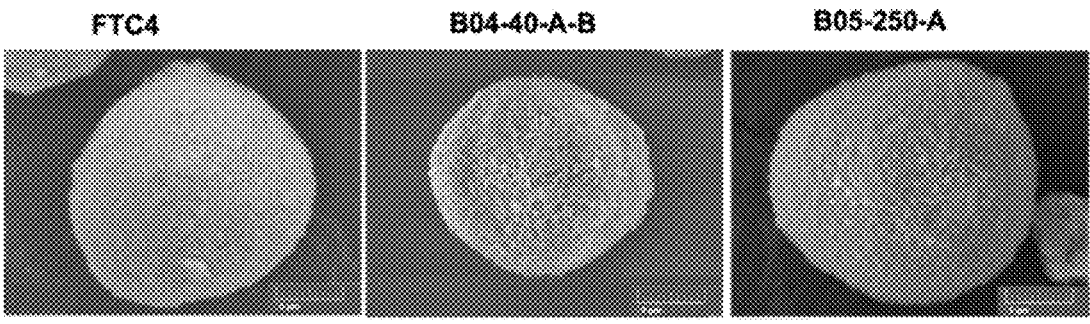
FIG. 4 shows SEM photographs for FTC4, B04-40-A-B, and B05-250-A at a magnification of 10.00K.
Figure 5:
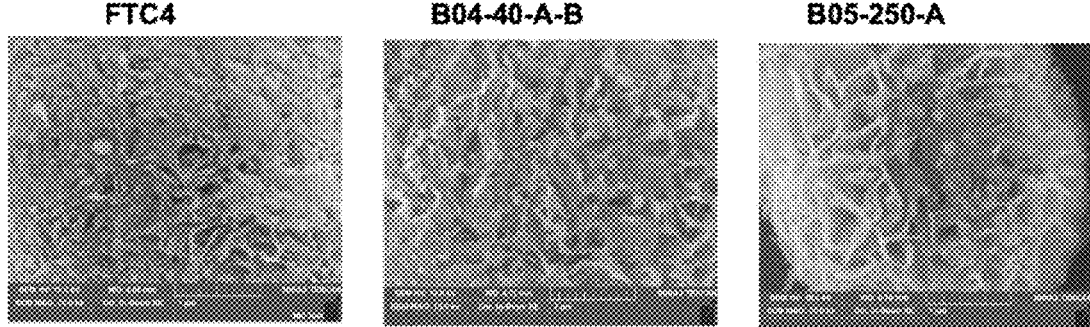
FIG. 5 shows SEM photographs for FTC4, B04-40-A-B, and B05-250-A at a magnification of 70.00K.

FIG. 4 and FIG. 5 are SEM photographs for FTC4, B04-40-A-B and B05-250-A at different magnifications. According to FIG. 4 and FIG. 5, it can be figured out that, the coating layers of three kinds of positive electrode materials all completely cover the surface of SJ18P, and the coating layers of three kinds of positive electrode materials all have porous structures, so that the coating layers contain more micropores to adsorb water, thereby reducing an amount of free water in the electrolyte solution of the alkaline secondary battery, which is beneficial to inhibiting a problem of capacity decay for the alkaline secondary battery at high temperature.

Comparative Example 1

The present Example provides a positive electrode material, and a preparation method therefor includes the following steps:

S100: Around 10 g of SJ18NP is mixed with around 10 mL of 10 N NaOH solution to obtain a slurry;

S200: Air is blew into the slurry at a flowing rate of 3.5 L/min for 4 h, thus oxidizing the precipitated cobalt hydroxide into cobalt oxyhydroxide, wherein, relative to a mole of cobalt in the coating, total feeding amount for oxygen is 52.0 L/mol Co;

S300: Solid-liquid separation is conducted, and the recovered powder is washed with water and filtered out again. The obtained powder is dried at 120° C. for 20 h in vacuum to obtain a positive electrode material, donated as SJ18.

The coating layers of the positive electrode materials provided by Examples 1-3 and the positive electrode material provided by Comparative Example 1 are subjected to XPS analysis, and the obtained results are shown in Table 1.

TABLE 1

| Positive electrode material | Core material | Content of tetravalent cobalt compound in the coating layer (wt %) | Content of trivalent cobalt compound in the coating layer (wt %) |
|---|---|---|---|
| SJ18 | SJ18P | 24 | 76 |
| FTC4 | SJ18P | 67 | 33 |
| B04-40-A-B | SJ18P | 76 | 24 |
| B05-250-A | SJ18P | 74 | 26 |

According to the results in Table 1, nickel hydroxide particles coated with cobalt hydroxide subjected to oxidation treatment by means of the existing technical solution show 24 wt % tetravalent cobalt compound in the obtained coating layer, which is far less than 45 wt %. Therefore, the positive electrode material prepared through the method provided by the present invention can obtain a higher electrical conductivity and a better stability.

Figure 6:
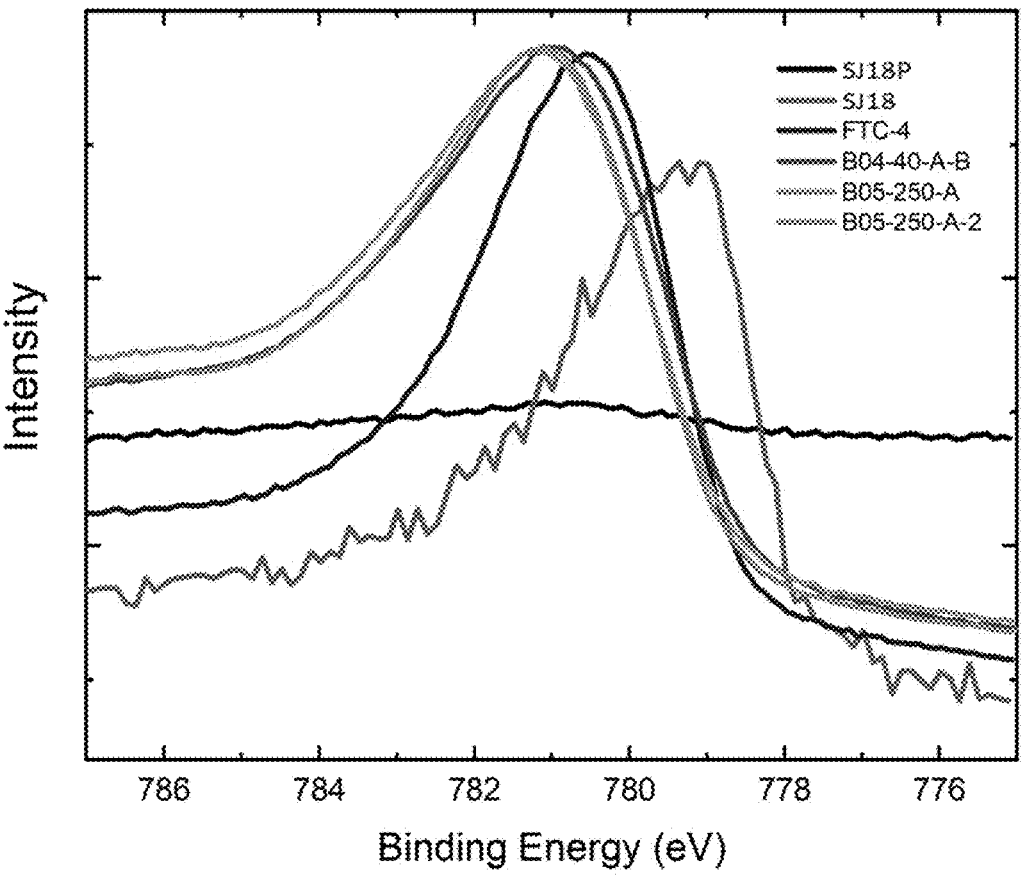
FIG. 6 shows XPS spectra for FTC4, B04-40-A-B, B05-250-A, and SJ18.

The coating layers of FTC4, B04-40-A-B, B05-250-A, and SJ18 are subjected to XPS analysis, and the results are shown in FIG. 6 (wherein, B05-250-A material is subjected to XPS analysis twice, and in order to distinguish the two results, the XPS spectrum for the second time is donated as B05-250-A-2). The Co 2p3/2 peak near 780.5 eV can be decomposed into two fitted peaks at 780.03 eV and 781.19 eV. The peak with a binding energy of 780.03 eV can be attributed to trivalent cobalt, and the peak of 781.19 eV can be attributed to tetravalent cobalt. A ratio of $Co^{4+}/Co^{3+}$ can be estimated by integrating the corresponding peak areas. It can be observed from FIG. 6 that the method provided by the present invention can obtain a coating layer containing different ratio of $Co^{4+}/Co^{3+}$.

Figure 7A:
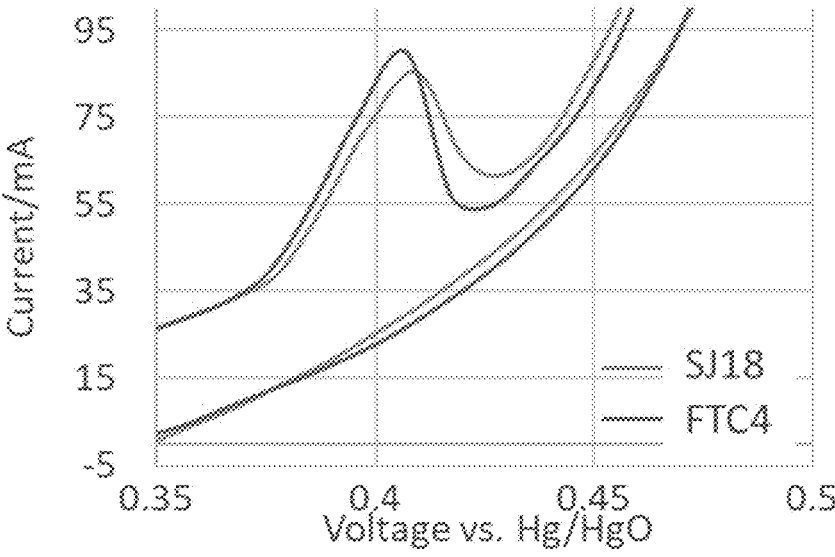
FIG. 7(a) and FIG. 7(b) show cyclic voltammetry results.
Figure 7B:
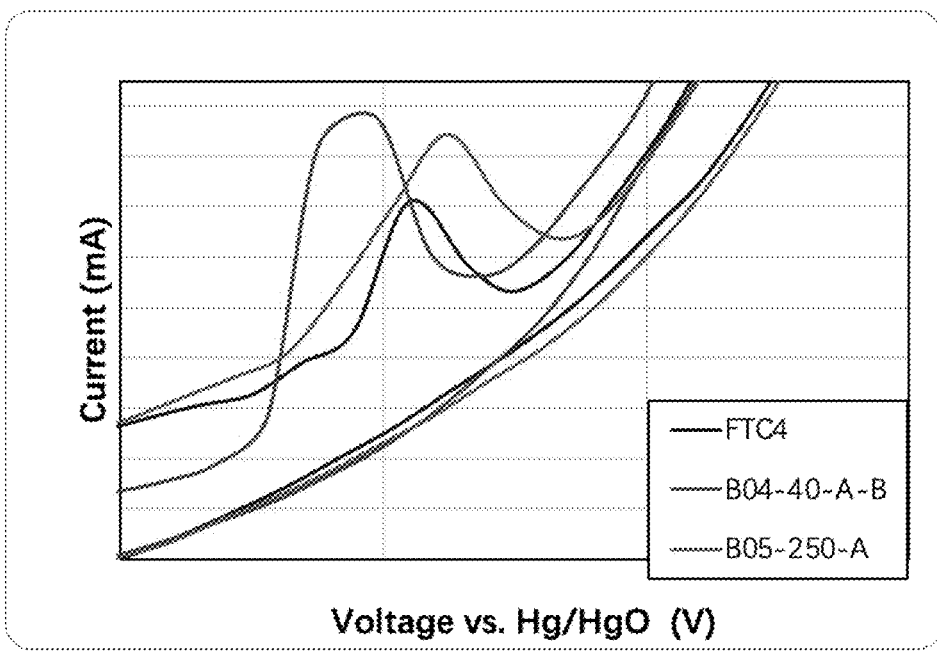

Working electrodes are prepared by using FTC4, B04-40-A-B, B05-250-A, and SJ18 as active material, and the process may be realized by any one of the prior arts. A three-electrode system (comprising Hg/HgO as the reference electrode, a nickel foam piece as the counter electrode, one of the above-described working electrode, and an electrolyte of 30 wt % of KOH solution) is employed. Maccor 4000 series is employed to subject each working electrode to a cyclic voltammetry test at 80° C., and the results are shown in FIG. 7(*a*) and FIG. 7(*b*). According to FIG. 7(*a*) and FIG. 7(*b*), difference between the oxidation potential and the reduction potential of SJ18 material at 80° C. is $\Delta E_{OE-E}=18$ mV; difference between the oxidation potential and the reduction potential of FTC4 material at 80° C. is $\Delta E_{OE-O}=20$ mV; difference between the oxidation potential and the reduction potential of B04-40-A-B material at 80° C. is $\Delta E_{OE-O}=20$ mV; and difference between the oxidation potential and the reduction potential of B05-250-A material at 80° C. is $\Delta E_{OE-O}=21$ mV. A larger $\Delta E_{OE-O}$ indicates that the material has a better stability at high temperature.

Figure 8:
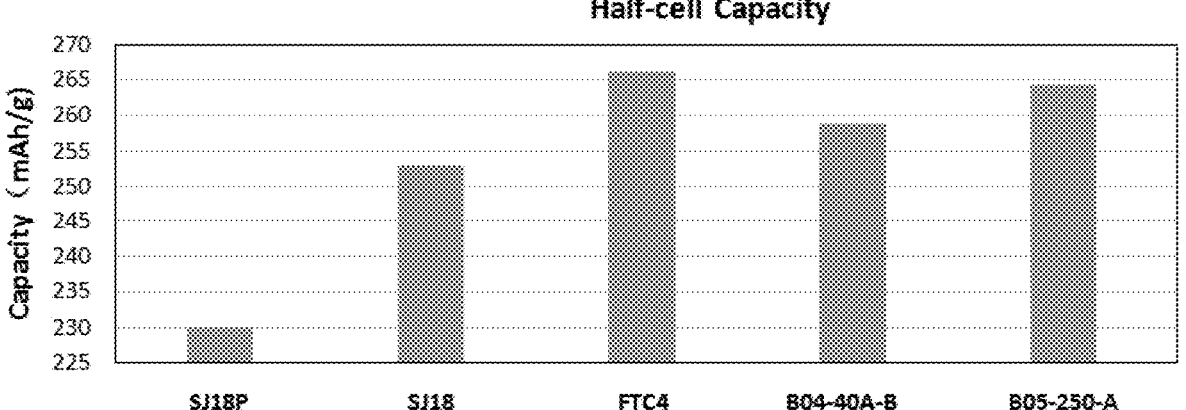
FIG. 8 shows a comparison figure of half-cell discharge capacity at room temperature.

Half-cells having the same positive electrode active material mass are prepared by using FTC4, B04-40-A-B, B05-250-A, and SJ18, and the process may be realized by any one of the prior arts. The half-cells are activated by repeating the charge/discharge process (57.8 mA/g for 6 h and 57.8 mA/g until a cut-off voltage of 1 V, respectively) until the positive electrodes are completely activated and reach the maximum capacities thereof. Their discharge capacities (with a cut-off voltage of 1 V) are measured at room temperature (25-30° C.), and the results are shown in FIG. 8. According to FIG. 8, the positive electrode materials provided by the present invention have higher capacities due to the higher $Ni(OH)_2$ core material utilization resulted by the coating layers with higher content of tetravalent cobalt compound.

500-mAh full cells (AAA-type) are prepared with B05-250-A and SJ18 with the same mass as positive electrode active materials. A hydrogen storage material is used as the negative electrode active material for the full cell. The positive electrode of the full cell is formulated with the positive electrode active material, cobalt oxide (CoO), and diytterbium trioxide ($Yb_2O_3$) in a mass ratio of 98:1:1. The electrolyte of the full cell is an alkaline solution comprising sodium hydroxide (NaOH) and lithium hydroxide (LiOH). After the full cells are activated, capacities are measured at room temperature (i.e. initial capacity measurement). Then, two ends of each full cell in a fully charged state are connected to a 2-ohm resistor, and it is placed in an oven at 60° C. and subjected to a high-temperature short-circuit test for 14 days. Finally, the resistors are removed, and the full cells are discharged at room temperature to rid the residual capacities, charged, and measured for capacities (i.e. capacity measurement after high-temperature short-circuit test). Capacity recovery rate=(capacity after high-temperature short-circuit test)/(initial capacity), and the higher recovery rate for capacity is better. The test results are shown in Table 2, showing that the positive electrode material provided by the present invention provide a higher capacity recovery, and using the positive electrode material provided by the present invention in full cell can significantly improve the high-temperature performance.

TABLE 2

| Positive electrode active material of the full battery | Recovery for capacity after short-circuit test at 60° C. for 14 days |
| --- | --- |
| B05-250-A | 66% |
| SJ18 | 53% |

Since the positive electrode material of the present invention has a higher electrical conductivity, it has a higher active material utilization in the alkaline secondary battery, which is suitable to be used as a power supply for portable electronic equipment requiring high capacity. In addition, it is also suitable for electric vehicle requiring high-rate capability.

Various technical features in Examples described above may be combined arbitrarily. In order to simplify the description, not all possible combinations of various technical features in the above-described Examples are described. However, as long as there is no contradiction in any combination of these technical features, all should be regarded as within the range recited in the present specification.

Examples described above only exhibit several embodiments of the present invention, descriptions of which are more specific and detailed, but they cannot therefore be understood as limitation to the range of the present invention. It should be pointed out that, for those ordinary skilled in the field, some variants and improvements may also be made without departing from the conception of the present invention and all belong to the scope of protection of the present invention. Therefore, the scope of protection of the present invention should be determined by the appended claims.

The invention claimed is:

1. A positive electrode material, comprising a core material and a coating layer coated on the surface of the core material, the core material comprises nickel hydroxide, and the coating layer comprises a tetravalent cobalt compound; and based on the weight of the coating layer, the content of the tetravalent cobalt compound is no less than 45 wt %, wherein based on the weight of the coating layer, the content of the tetravalent cobalt compound is 67 wt %-76 wt %;

wherein the coating layer further comprises at least one of γ-CoOOH and β-CoOOH, wherein when the coating layer includes γ-CoOOH, the cobalt contained in γ-CoOOH is not at a valence of +4.

2. The positive electrode material according to claim 1, wherein the core material is nickel hydroxide represented by a general formula: $Ni_{1-x-y}Co_xN_y(OH)_2$, where x is 0.005-1, y is 0.005-1, and N is one of calcium, magnesium, and zinc.

3. An alkaline secondary battery, wherein the positive electrode active substance of the alkaline secondary battery comprises a positive electrode material according to claim 1.

4. A method for preparing a positive electrode material according to claim 1 comprising the following steps:

a step of preparing a precursor through a coprecipitation method, comprising formulating a first solution containing M ions, cobalt ions, nickel ions, and ammonium ions, wherein M is one of calcium, magnesium, and zinc; formulating a first alkaline solution containing hydroxyl ions; and uniformly mixing the first alkaline solution and the first solution, then collecting the resulted precipitate, washing the precipitate, and drying the precipitate at high temperature to obtain the precursor;

a coating step, comprising formulating a second alkaline solution containing ammonium ions; formulating a second solution containing cobalt ions; dispersing the precursor in the second solution to form a first suspension; and adding the second alkaline solution into the first suspension while stirring, collecting the resulted precipitate, washing the precipitate, and drying the precipitate at high temperature to obtain particles having a coating layer comprising $\alpha$-Co(OH)$_2$; and an oxidizing step, comprising formulating a sodium hypochlorite solution; dispersing the particles coated with $\alpha$-Co(OH)$_2$ in water to form a second suspension; and adding the sodium hypochlorite solution into the second suspension while maintaining a constant temperature and stirring, collecting the resulted precipitate, washing the precipitate, and drying the precipitate to obtain the positive electrode material.

5. The method according to claim 4, wherein M ions are zinc ions.

6. The method according to claim 5, wherein the cobalt ions derive from cobalt sulfate, the zinc ions derive from zinc sulfate, the nickel ions derive from nickel sulfate, and the ammonium ions derive from ammonium sulfate.

7. The method according to claim 6, wherein in the step of preparing the precursor through the coprecipitation method, the first alkaline solution is added into the first solution at a speed of 3 mL/min, and the pH value of the mixture formed from the first alkaline solution and the first solution is adjusted to 12.

8. The method according to claim 7, wherein in the coating step, the second alkaline solution is added into the first suspension at a speed of 1.0 mL/min, and after the color of the mixed solution formed from the second alkaline solution and the first suspension is changed from green to bluish green, the pH value of the mixture is controlled at a value within the range of 8.0-8.2.

* * * * *